United States Patent
Bizzaro et al.

(10) Patent No.: US 6,304,970 B1
(45) Date of Patent: Oct. 16, 2001

(54) HARDWARE ACCESS CONTROL LOCKING

(75) Inventors: Mario Bizzaro, Segrate (IT); Vincenzo Condorelli, Poughkeepsie, NY (US); Michel Henri Theodore Hack, Peekskill, NY (US); Jeffrey Kenneth Kravitz, Yorktown Heights, NY (US); Mark John Lindemann, Pleasantville, NY (US); Elaine Rivette Palmer, Goldens Bridge, NY (US); Gianluca Pedrina, Milan (IT); Sean William Smith, Cornwall, NY (US); Steve Harris Weingart, Boca Raton, FL (US)

(73) Assignee: International Business Mcahines Corporation, Armonk, NY (US)

( * ) Notice: Subject to any disclaimer, the term of this patent is extended or adjusted under 35 U.S.C. 154(b) by 0 days.

(21) Appl. No.: 08/922,792

(22) Filed: Sep. 2, 1997

(51) Int. Cl.[7] ........................................... G06F 12/14
(52) U.S. Cl. ............................... 713/200; 709/104
(58) Field of Search .................... 713/200, 201; 711/163; 714/39, 49, 50; 710/200; 709/100, 104, 108, 225, 226, 229

(56) References Cited

U.S. PATENT DOCUMENTS

| | | | |
|---|---|---|---|
| 5,027,317 | * 6/1991 | Pepera et al. | 711/163 |
| 5,113,518 | * 5/1992 | Durst, Jr. et al. | 713/200 |
| 5,398,196 | * 3/1995 | Chambers | 714/28 |
| 5,421,006 | * 5/1995 | Jablon et al. | 714/38 |
| 5,758,182 | * 5/1998 | Rosenthal et al. | 710/22 |
| 5,809,544 | * 9/1998 | Doresey et al. | 711/163 |
| 5,870,543 | * 2/1999 | Ronning | 713/200 |
| 5,887,190 | * 3/1999 | Priem et al. | 710/3 |
| 5,909,595 | * 6/1999 | Rosenthal et al. | 710/38 |

* cited by examiner

Primary Examiner—Gilberto Barron, Jr.
Assistant Examiner—Christopher A. Revak
(74) Attorney, Agent, or Firm—Douglas W. Cameron

(57) ABSTRACT

An apparatus for permitting access to protected code, protected data or protected devices only when a computer system is in a trusted state, where said trusted state occurs only when said system is executing trusted code under a set of preselected conditions. This apparatus also has a device for exiting the trusted state and for preventing access to protected code, data and devices when the trusted state is exited. The computer system is also programmed to automatically generate a disabling signal upon the completion of execution of trusted code, and this disabling signal will result in the prevention of access to protected devices or code.

8 Claims, 3 Drawing Sheets

HARDWARE ACCESS CONTROL LOCKING

TECHNICAL FIELD

This invention relates to a hardware locking mechanism to limit access to code, data and devices to only when a computer system is executing trusted code.

DESCRIPTION OF THE PRIOR ART

Due to the recent explosive development of the internet and other wide ranging data communications, there is a growing interest in secure processor technology as a means to assure secure communications and transactions. To make these systems more useful, it is desirable to enable updating of internal persistent software (stored in FLASH or EEPROM memory), and to permit the loading of external application software into the system's RAM for execution. Enabling such updating and downloading, however, creates the problem that the introduction of intentionally or unintentionally hostile software could create an information leak, or grant access to controls for changing the contents of secret data or the FLASH.

Secure computing systems all have the problem of controlling access to various hardware and software objects so that only authorized software processes can access certain data or hardware. In most cases the design of the central processing unit can do this job adequately by use of common mechanisms such as a supervisor or high privilege state. However, if the operating system software has an unintentional hole in its coverage, or an intentional trapdoor or other unauthorized path, it may be possible for that software to access objects that it normally should not be able to access.

There is therefore a need to limit access to many components of a computer system, where the controlled access cannot be circumvented by hostile software running on the system.

SUMMARY OF THE INVENTION

This invention is a method to minimize the above risks by creating a system that can limit access to memory containing secret data, and to the signals that control the access to many parts of the system via hardware control that cannot be circumvented by software running on the system even if that software is intentionally hostile. By applying these techniques to a secure processor that is packaged in a secure enclosure, a very secure system can be developed.

By use of hardware locking devices, one can limit access to many objects, either to software that has been given access to a secret, like a key consisting of a string of bits; or access to code that runs at a particular time, e.g., the tested, trusted, unchangeable ROM (read only memory) code that must execute as the first thing each time the processor is reset.

Each of the locking devices function by means of adding an additional control signal required to access the protected hardware device. The protected devices may include, but are not limited to, random access memory devices (RAM), read only memory devices (ROM), erasable/re-writable read only memory devices (EEPROM or FLASH). Access can be controlled in either the read or write modes, or both. Virtually, any input/output (I/O) device or port that has conventional digital access controls can also have its access controlled in this manner.

Note that there does not need to be any special signal input to the protected device itself, except for the enable signal can be used. The control signal can be added to the standard address or function based control logic which is usually applied in standard design practice.

Accordingly, this invention is an apparatus for protecting access to code, data or devices of a computer system so that access can only be obtained when the processor of the system is executing trusted code. This invention comprises a state machine which is used to determine when the computer is in one of a number of trusted states, where each trusted state is defined as a state in which the computer executing trusted code in a correct context. The correct context conditions. One such condition could be the entry of a secret key. This invention also comprises a means for allowing access to the protected code, data or device when the system is determined to be in one of the trusted states. This invention will also prevent access to the protected code, data or devices when the computer exits one of the trusted states. By implication, this invention also includes the means for exiting the trusted state, which usually occurs after the processor has completed execution of the trusted code.

DESCRIPTION OF THE PREFERRED EMBODIMENTS

Figure 1:
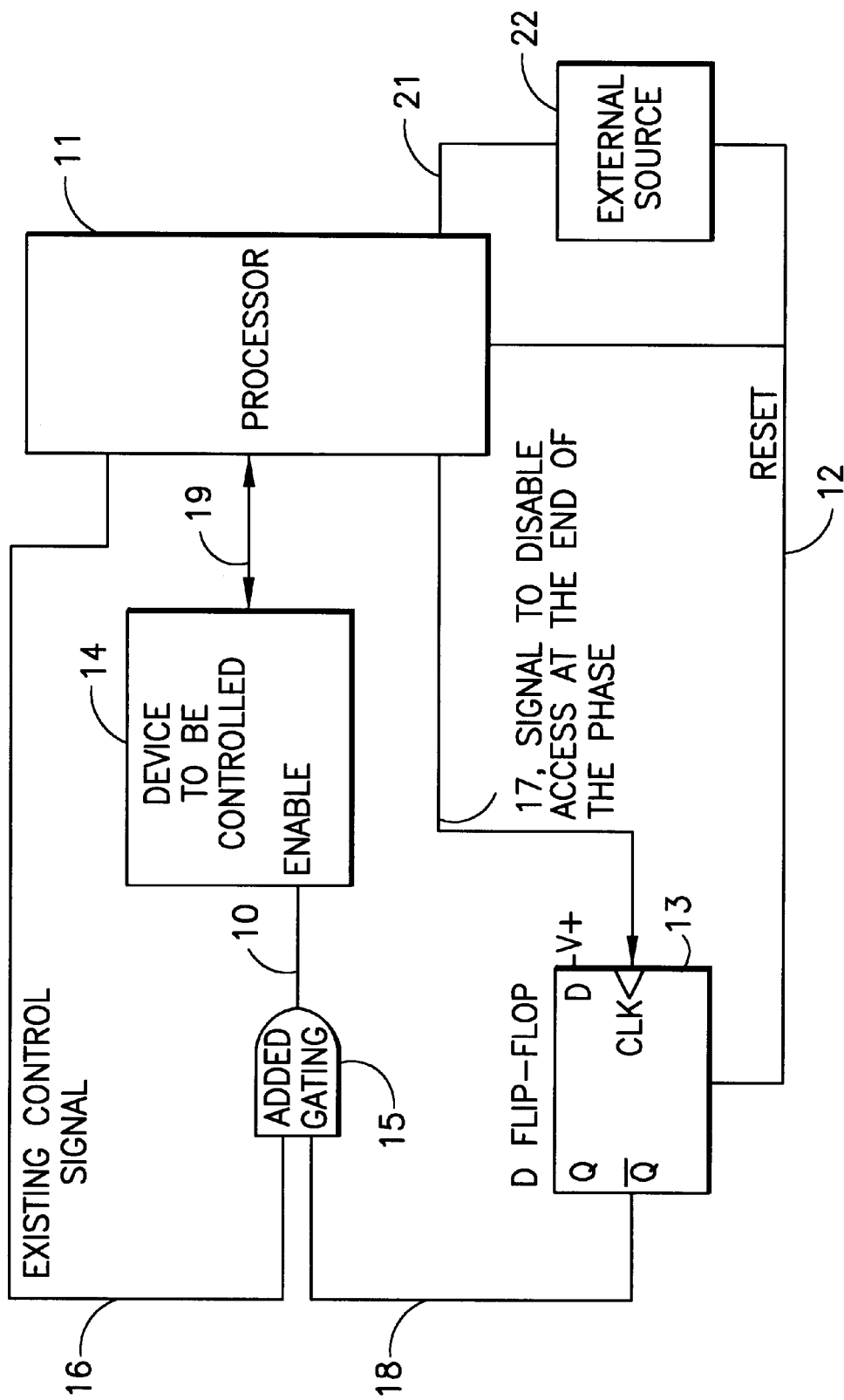
FIG. 1 schematically illustrates a hardware locking mechanism implemented using a D type flip-flop.

Referring to FIG. 1, in the most simple instance the hardware locking mechanism can be implemented using a D type flip-flop (13) by connecting the reset line (12) to the system reset and the clock line to a standard I/O control signal generated by the host computer (17).

When the system is reset by activation of the reset line (12) the output (18) of the D flip-flop (13) goes active, enabling the added gating (15). This action will permit the existing control signal (16) to activate the enable (10) signal on the device to be controlled (14). When in this condition, the trusted code running on processor (11) is given access to the controlled code, data and devices. We can be sure that the processor has entered the trusted state, because activation of the reset line always causes the processor to start execution at the same location each time. The trusted code is installed in permanent memory in the processor as the location where execution begins after a reset.

Before it exits, the trusted code executing on the processor activates the signal to disable access (17) to controlled code, data and devices. This signal clocks the flip-flop, and since the D input is permanently tied high, the output will deactivate and not be active again until the reset line is activated again.

This embodiment describes a very simple state machine with only two states. One state is entered when the processor is reset, which defines, in this embodiment, entrance into the trusted code in a known context. In this one state access is granted to controlled code devices and data. In the other state, which is entered by the trusted code signaling the exit from the trusted state (17), access to the controlled code, devices, or data will no longer be permitted.

It is clear that there can be a multiplicity of the control groups, each group being a combination of elements 12–13 and 16–18 and acting on several devices (14), such that there can be a set of states where some or all of the flip-flops (13) may be enabled or disabled during the execution of trusted code. This trusted code may be hierarchical in that, if there are three flip-flops (13), all of them will be enabled at reset at the end of the most trusted phase. The code may disable access to only part of the controlled code, devices, or data; and the code may leave access enabled for subsequent sections of less trusted code. Before the lowest level of trusted code is exited, all access from controlled code, devices and data may be removed.

Preferred Embodiment 2, More Complex

Figure 2:
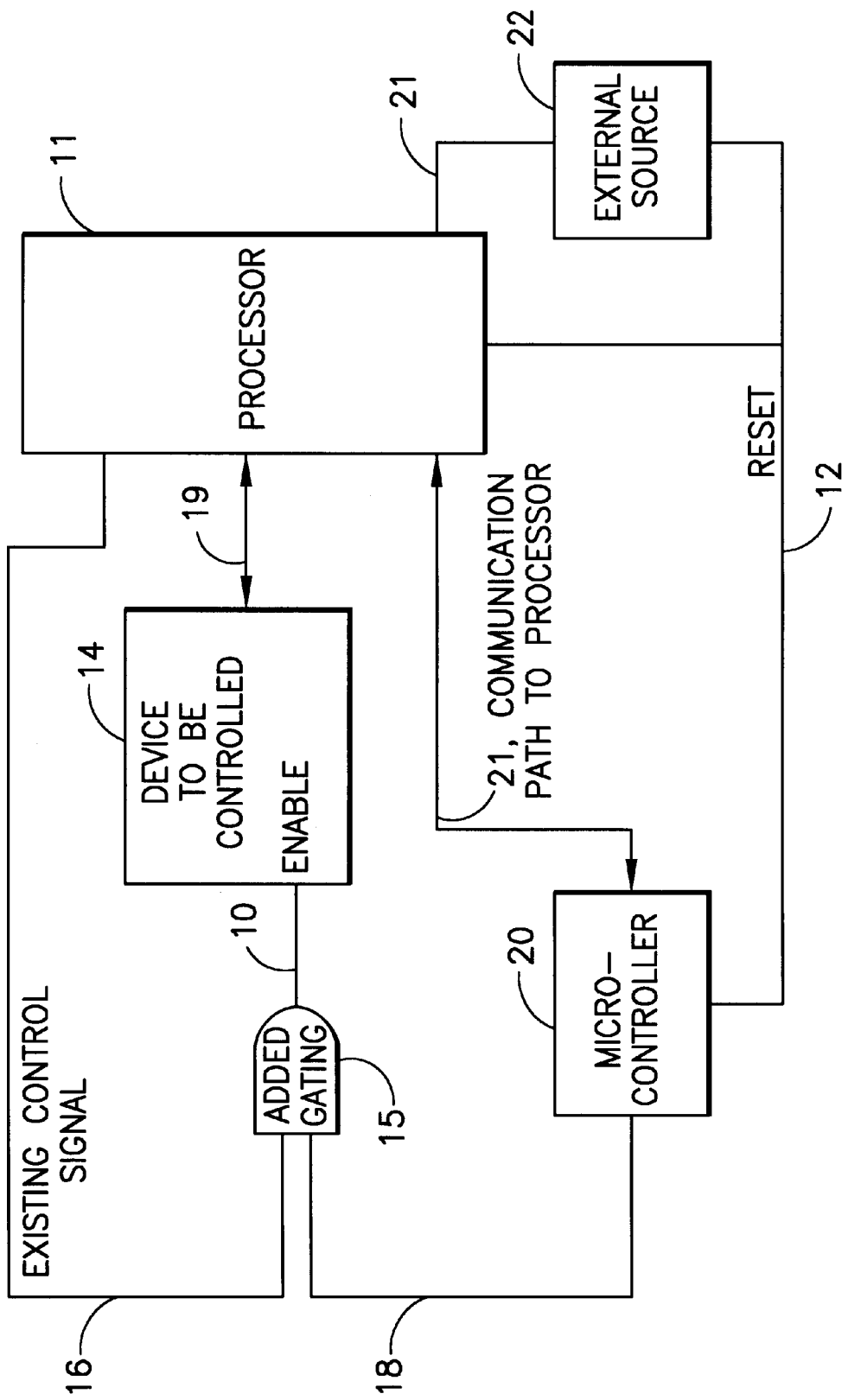
FIG. 2 schematically illustrates a hardware locking mechanism using a microcontroller.

Referring to FIG. 2, to create a more flexible control system, the flip-flop (13) of preferred embodiment I can be replaced with a microcontroller (20), and the signal to disable access (17) can be replaced with a bi-directional communication path (21;).

These replacements allow the conditions under which the hardware locking mechanism grants or denies access to the code, devices, or data to be more complex if desired. In the most simple implementation, the microcontroller (20) can emulate the function of the flip-flops (13), but more complex implementations can be designed. Since the microcontroller can be programmed, any combination of rules can be devised and implemented.

Preferred Embodiment 3, Adding Key Locking

Figure 3:
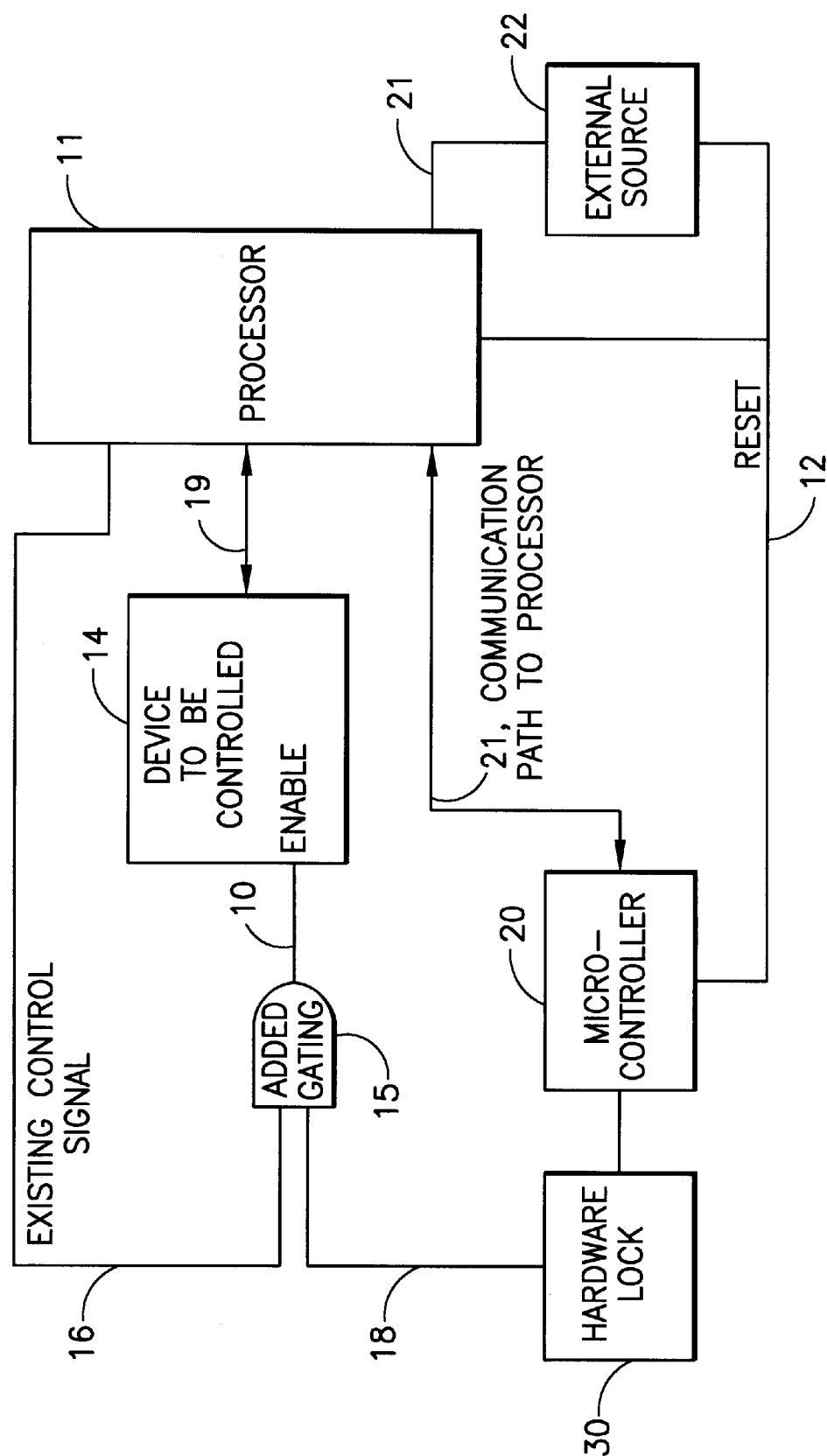
FIG. 3 schematically illustrates the implementation of the invention as shown in FIG. 2 with added mechanism of requiring knowledge of a secret key to permit access.

In preferred embodiment 2, a microcontroller is substituted for the simple flip-flop of embodiment 1. Referring to FIG. 3, in this third embodiment, the configuration remains the same as that in FIG. 2, but flexibility is increased by allowing access to the hardware locking mechanism by allowing the lock to be accessed under other conditions besides just the reset condition. To access the lock some trusted code has to know a secret which is used like a key.

To access the hardware locking mechanism, the mechanism must be provided with the appropriate key. The key consists of a prechosen string of random bits. When a correct key is entered, a command may be sent to unlock and permit access to one or more access controlled devices. A given hardware locking mechanism may have more than one 'channel', such that a master key may permit access to multiple devices, while a sub-key may only unlock a single or sub-collection of devices.

To prevent the brute force attack of simply trying many keys at random, one can make the hardware locking mechanism to accept only one try in a given time interval. If the key is 64 bits long, and the re-try time is one second, the time to find a key by chance would be approximately by $3*10 \exp 48$ years. It is also possible to allow only a few tries before requiring that the processor be reset and restarted before trying again. It is also possible to permanently disable a device that has had incorrect access attempts made more than a predetermined number of times.

The key to the lock does not need to be stored anywhere in the processor that the user, or any software has access to. The copy in the hardware locking mechanism may not be read out, and the copy needed to unlock the controlled code, devices, and data may be kept outside of the processor entirely.

If it is desired, the key never has to appear in plaintext while being handled by the processor, standard cryptographic or authentication protocols may be programmed into the microcontroller, and the processor can be used to handle, while not taking part in, the communication for the authentication process.

Preferred Embodiment, Additions

To guarantee that the correct signal is always applied from the time of power being applied to the system, the part of the hardware locking mechanism that is connected to the added gating (15) via control signal (18) can be implemented in a persistent technology that would remain in the state that it is set to, without further action, until it is commanded to change by the hardware locking mechanism (30). Such devices can be implemented with EEPROM base digital potentiometers, EEPALS (Electronically Erasable Programmable Array), or other similar persistent logic.

The key locking technique can be combined with the reset activation technique to only permit the key to be entered into the hardware locking mechanism when it is already in a trusted state.

Having thus described our invention, what we claim as new and desire to secure by Letters Patent is:

1. An apparatus for protecting access to control code, data, and devices in a computer system, said apparatus comprising:
   a. means for generating a disabling signal upon completion of execution by said computer system of trusted code;
   b. a state machine for determining when said computer system is in any of a number of trusted states, each trusted state being defined as a state in which said computer is executing trusted code in a correct context, said correct context being that the trusted code has been entered under a set of preselected conditions of operation of said processor, and wherein said state machine has an input for receiving said disabling signal and wherein said state machine determines that said computer system is no longer in any of said trusted states upon receiving said disabling signal;
   c. means for allowing access by said system to said control code, data and devices when said state machine determines that said system is in one of said trusted states; and
   d. means for preventing access to said control code, data and devices when said computer system exits any one of said trusted states.

2. An apparatus as recited in claim 1, wherein said state machine is a microprocessor.

3. An apparatus as recited in claim 1, wherein said state machine is a flip-flop circuit.

4. An apparatus as recited in claim 1, wherein said state machine has reset signal as its input, where the reset signal causes the processor to start the execution of trusted code.

5. An apparatus as recited in claim 1, wherein said state machine generates an output signal in response to said disabling signal to prevent access to either said control code, said data or said devices.

6. An apparatus as recited in claim 1, wherein said state machine has an input for entering a secret key wherein said state machine will generate said output signal to prevent access to said control code, data or said devices if said secret key is not entered in latter said input of said state machine.

7. An apparatus as recited in claim 1, wherein said means for allowing and preventing access by said system to said control code, said data and said devices comprises an AND gate for receiving a control signal from said processor and an output signal from said state machine, wherein an enable signal is generated when said output signal and said control signal are active, and wherein said enable signal permits access to said control code, said data, and said devices.

8. An method for protecting access to control code, data, and devices in a computer system, said method comprising the steps of:

a. generating a disabling signal upon completion of execution by said computer system of trusted code;

b. determining when said computer system is in any of a number of trusted states, each trusted state being defined as a state in which said computer is executing trusted code in a correct context, said correct context being that the trusted code has been entered under a set of preselected conditions of operation of said processor, and wherein said state machine has an input for receiving said disabling signal and wherein said state machine determines that said computer system is no longer in any of said trusted states upon receiving said disabling signal;

c. allowing access by said system to said control code, data and devices when said state machine determines that said system is in one of said trusted states; and d. preventing access to said control code, data and devices when said computer system exits any one of said trusted states.

* * * * *